United States Patent [19]

Stoll

[11] Patent Number: 4,790,587
[45] Date of Patent: Dec. 13, 1988

[54] GRIPPING DEVICE

[76] Inventor: Kurt Stoll, Lenzhalde 72, 7300 Esslingen, Fed. Rep. of Germany

[21] Appl. No.: 71,986

[22] Filed: Jul. 10, 1987

[30] Foreign Application Priority Data

Jul. 16, 1986 [DE] Fed. Rep. of Germany ....... 3624000

[51] Int. Cl.$^4$ .............................................. B66C 1/46
[52] U.S. Cl. ................................. 294/119.3; 294/98.1; 294/63.2
[58] Field of Search ............... 294/119.3, 93, 98.1, 294/63.2, 119.2, 86.4, 86.15, 86.24, 902; 269/22; 279/2 A

[56] References Cited

U.S. PATENT DOCUMENTS

| 3,219,382 | 11/1965 | Hugentobler | 294/119.3 |
| 3,881,762 | 5/1975 | Zappia | 294/119.3 |
| 4,285,537 | 8/1981 | Hawrylo et al. | 294/119.3 |

*Primary Examiner*—James B. Marbert
*Attorney, Agent, or Firm*—McGlew and Tuttle

[57] ABSTRACT

The invention relates to a gripping device with two spaced gripping elements of which at least one has a backing member with a flexible membrane secured thereto on its side facing the other gripping element. The gripping membrane encloses a pressure space over the backing member into which air may be forced to cause gripping of an article between the gripping element and from which it may be let off to release the article.

4 Claims, 3 Drawing Sheets

GRIPPING DEVICE

BACKGROUND OF THE INVENTION

The invention relates a gripping device comprising two oppositely placed, spaced gripping elements each having at least one gripping area on a gripping side thereof facing the respective other gripping element, the gripping area of at least one gripping element being able to be pneumatically operated so that in a released position it is further removed from the other opposite gripping surface and in a gripping position it is nearer to the opposite gripping surface.

Such gripping devices have become known under the designation of pneumatic vises for example and are employed for temporary holding of workpieces or articles of many different types. Pneumatic operation has the advantage that gripping and releasing operations may be carried out in quick succession using a source of compressed air under a constant pressure so that there is a constant gripping action for all of a sequence of consecutive gripping operations. A disadvantage has however so far been the fact the gripping surfaces are of a metallic nature so that application is not possible in those cases in which the workpiece or the component to be gripped is prone to be damaged where it is clamped, such damage for instance being in the form of scratches or dents and the like. If the gripping device is for instance to be utilized in conjunction with a lifting device for moving empty or filled cartons in the packaging industry there are likely to be difficulties inasfar as the cartons are not sufficiently stiff in order to oppose the gripping force transmitted by the gripping surfaces. The consequence of this is that the cartons are crushed. Accordingly for such applications vacuum holding devices have been adopted in place of gripping devices of the type in question. However, such suction holding devices are only fully effective if the surfaces of the cartons are quite smooth, and the equipment is not applicable to cartons with a rough surface such as the surface of corrugated board. Since magnetic devices may not be used in this case either, manual labor usually has to be relied upon.

SHORT OUTLINE OF THE PRESENT INVENTION

One object of the present invention is to devise a gripping device of the initially mentioned type which reliably engages and holds the workpieces without damage, i.e. with a gentle clamping action.

A further aim of the invention is to provide such a gripping device which is suitable for handling objects even if they are of a comparatively soft nature.

In order to achieve these or other objects appearing herein, the gripping element having the movable gripping area has a backing member on whose gripping side there is a flexible gripping membrane which cooperates with the backing member in forming a pneumatic pressure space which is sealed off from the outside and is in communication with at least one operating line and the outer surface of the membrane turned away from the backing member forms the movable gripping surface, the pneumatic pressure space being able to be charged with air via at least one operating line for controlling the position of the movable gripping surface.

Since the gripping surface is constituted by flexible material damage to the workpieces or components, as for example by scratching of denting, is quite out of the question so that the gripping device of the invention may be employed for gripping and holding objects with high-quality, sensitive surfaces. It is more particularly in cases in which both the gripping elements are provided with a gripping membrane that gripping operations without metallic contact become possible and the articles may be engaged with a gentle clamping action. The gripping device is useful as a manipulator for shifting or positioning articles such as cartons which are inherently less stiff, for the presence of the gripping membrane means that an even and large-area distribution of the gripping force takes place and this prevents crushing of the articles. A further advantage is that on lifting a workpiece by means of the gripping device the workpiece may be securely held even with low gripping forces, since the area of contact between the respective gripping surface and the adjacent area of the workpiece involves a large coefficient of friction owing to the flexible nature of the gripping membrane. This leads to a secure and gentle gripping action both in the case of rough and also in the case of smooth surfaces on workpieces.

In accordance with one development of the invention the backing member is in the form of a rail or plate, the gripping membrane being arranged on one of the two generally flat sides of the backing member which have a large area, and there is an air tight connection with the backing member at the outer periphery of the membrane so that there is an annular connection joint. This leads to a very thin gripping element, something which is a particular advantage if the gripping device is to be used as a manipulator and the article to be gripped is to be placed adjacent to a further article with only a small spacing between the two articles. The rail-like or plate-like backing member means that the device may readily be inserted between two adjacent articles.

Further developments of the invention are defined in the claims.

Embodiments of the invention will now be described in detail with reference to the drawings.

LIST OF THE SEVERAL VIEWS OF THE DRAWINGS

DETAILED DESCRIPTION OF THE EMBODIMENTS OF THE INVENTION

Figure 1:
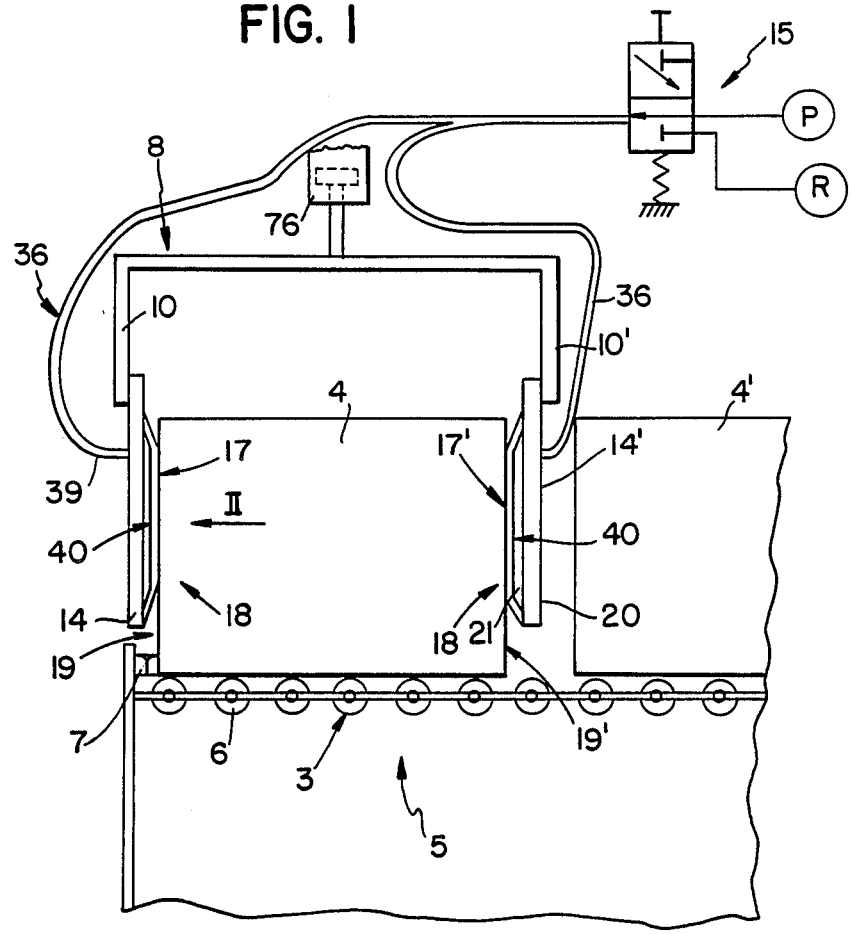
FIG. 1 is a diagrammatic view of a first working example of the gripping device in accordance with the invention as seen from the side, the device being adapted to act as a lifting member rather than as a vise.

In FIG. 1 the reader will be able to see a section of a roller conveyor 3 on which articles 4 and 4' are being moved in sequence to an unloading station 5. For moving the articles it is possible for rollers 6 of the roller conveyor to be driven, although it may be a question for an inclined roller conveyor utilizing the force of gravity to move the articles. At the end of the roller conveyor 3 there is an article abutment 7 which so positions the article 4 at the unloading station 5 that it is precisely arranged under gripping device 8, which is in the form of a lifting device capable of moving vertically. The gripping device 8 has a transverse member 9 over the respective article 4 and which is aligned in the longitudinal direction of the roller conveyor 3. At its ends the transverse member 9 is bent towards the roller conveyor 3 and at the end of such bent parts 10 and 10' there are respective gripping elements 14 and 14' which are connected with a control device 15 for operating them. The lifting motion of the complete gripping device 8 is caused by an actuator cylinder 16 whose piston rod is connected with the transverse member 9.

The gripping device which is able to be lifted constitutes one of a number of different advantageous forms of the invention. The invention is however not limited to this specific construction. If suitably designed the gripping device may for instance be used as a vise to hold workpieces or for positioning workpieces in production systems.

A significant feature of this gripping device is that, as indicated in figure 1, there are two spaced, opposite gripping elements 14 and 14' with at least one respective gripping surface 17 and 17' on the gripping sides 18 thereof which are turned towards the respective other gripping surface. The gripping surface 17 or 17' of at least one of the gripping elements 14 and 14' is able to be moved pneumatically towards the opposite gripping element and in the opposite direction, that is to say between the release position further removed from the respective opposite gripping surface and a gripping position which is nearer to the opposite gripping surface.

In FIG. 1, in which the two gripping elements are each equipped with a moving gripping surface, the two gripping surfaces are in a gripping position in which they are in engagement with opposing side surfaces 19 and 19' of the article 4 which is positioned in the unloading station 5 so that the article is so held firmly that it will be lifted from the roller conveyor 3 when the gripping device is moved upwards.

In some applications it would also be possible to have such a device with merely one moving gripping surface.

Figure 2:
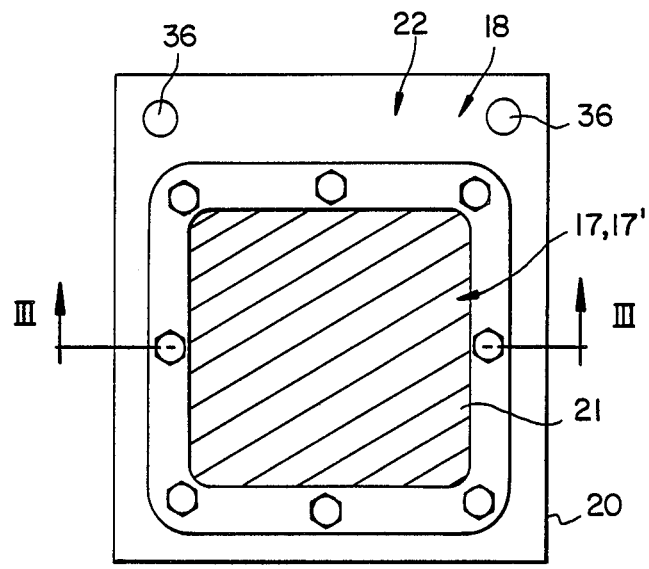
FIG. 2 shows a gripping element of the device of FIG. 1 as seen in from above looking in the direction of the arrow II in FIG. 1.
Figure 3:
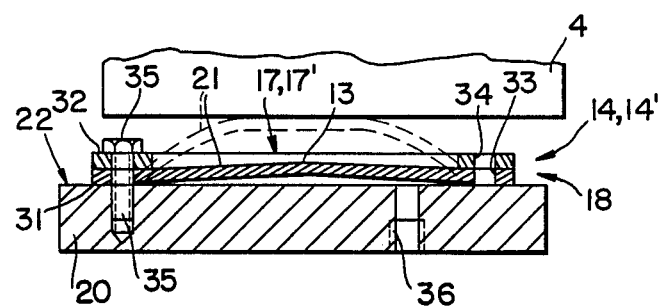
FIG. 3 shows the gripping element of FIG. 2 in cross section taken on the section line III—III in FIG. 2.

The following decription referring to FIGS. 2 through 5 is devoted to two working examples of the invention with moving gripping surfaces on the gripping elements in acordance with the invention, FIGS. 2 and 3 showing the gripping elements used in the working example of FIG. 1.

Figure 4:
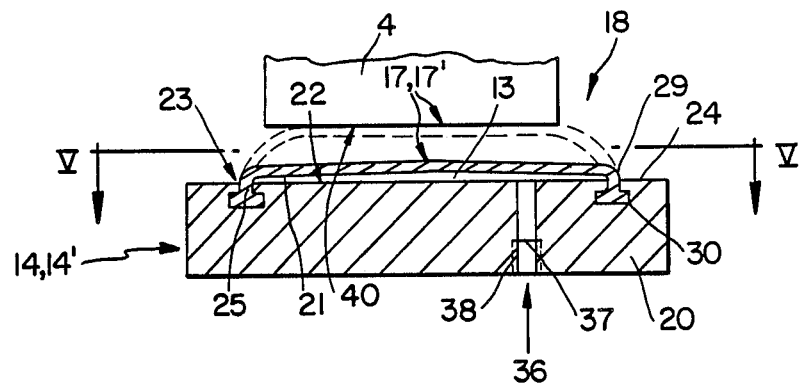
FIG. 4 shows a further embodiment of a gripping element in a longitudinal section as taken on the section line IV—IV of FIG. 2, a workpiece being indicated in broken lines.
Figure 5:
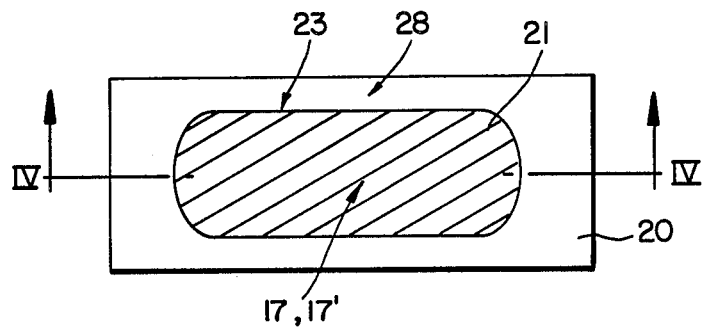
FIG. 5 shows the gripping element of FIG. 4 in plan view as indicated by the line V—V in FIG. 4.

Each of the gripping elements has a backing member 20 which in the working example of FIGS. 4 and 5 is in the form of a rail with a rectangular cross section and in the embodiment of FIGS. 2 and 3 is in the form of a plate. One of the two backing member sides with a large surface area forms the gripping side 18 towards which the respective other gripping element is turned. On this gripping side 18 there is a flexible gripping membrane 21 so that the plane of the membrane is generally parallel to the plane of the rail or of the plate as the case may be. The gripping membrane 21 is so secured to the gripping side 18 of the backing member 20, that is to say on the backing member surface 22 directed towards the opposite gripping element, that with the backing member 20 or a part of the surface 22 it forms an pneumatic pressure space 13 which is sealed off from the outside.

As indicated in FIGS. 4 and 5 in surface view the membrane 18 has the form of a rectangle with rounded narrow sides and its edge or periphery 23 is hermetically joined to the backing member 20. The form of join between the two parts is in this case an interlocking join for which purpose the gripping membrane has a continuous joint member 24 at its peripheral edge 23. This joint half snaps into a second joint half in the form of a groove in the backing 20. The first joint half is in the present case a rim or bead with a T-like cross section to be received in the complementary groove 30 in the surface 22 of the backing member. The groove forms a complete ring adapted to the shape of the peripheral edge 23 of the membrance 21. The rim or bead is snappled with a interlocking action into the groove to provide a seal.

In the working example of the invention of FIGS. 2 and 3 the connection means between the gripping membrane 21 and the backing member 20 is also annular but the gripping membrane 21 is screwed to the backing member 20. The gripping membrane 21 is provided with an annular attachment plate 31 arranged at the outer periphery and extending in the circumferential direction. The plate or strip 31 is arranged between the backing member 20 and a suitable clamping ring 32 corresponding in shape to that of the attachment plate. Under the attachment plate 31 the gripping membrane 21 has circumferentially spaced apertures 33 aligned with openings 34 which are provided in the clamping ring 32 so as to be present in a suitable number and configuration to match the apertures 33. Respective screws 35 are inserted through the apertures and openings and screwed into tapped holes in the backing member 20.

This system means that the clamping ring 32 is held against the backing member 20 and at the same time the attachment strip 31 is held so firmly that the pneumatic pressure chamber 13 is sealed off from the outside.

As seen in plan view the gripping membrane 21 of this embodiment of the invention has the form of a square with rounded corners so that consequently the clamping ring 32 is also square and has rounded corners. The backing member surface 22 is of rectangular outline and is somewhat larger than the area of the gripping membrane 21. At 36 it is possible to see two holes serving to attach the gripping elements to the bent parts 10 and 10' of the gripping device 8.

The gripping elements of the invention are so designed that the movable gripping surface 17 and 17' is formed by the outer surface of the membrane facing away from the associated backing member 10. The movement of the membrane surface is produced pneumatically by filling pneumatic pressure space 13 via an operating line 36 with compressed air and venting it as may be desired. It is convenient if a section of the operating line 36 is formed by a duct 37 extending in the backing member so that at one end it opens into the pneumatic pressure space 13 and at the other end has a threaded part 38 for the connection of a pressure medium hose 39 as shown in FIG. 1.

In the present working example of the invention the operating line 36 made up of the pressure medium hose 39 and the duct 36 is connected with the initially mentioned control device 15, which when suitably set is able to connect the pneumatic space 13 with a source P of fluid under pressure or with a discharge means receiving spent fluid (venting at R).

It is preferred for the gripping membrane 21 to be fashioned of plastic material, more especially one with elastomeric properties.

The manner of operation of the gripping device in accordance with the invention will now be described.

In the vented condition of the pneumatic pressure space 13 the respective gripping surface 17 and 17' is in its released state and is generally on the preferably plane surface 22 of the backing member carrying the membrane. While keeping the membranes in the released state it is possible for an article to be introduced between the two opposite gripping surfaces 17 and 17', as is depicted in FIG. 1 for instance. A condition in this respect is obviously that the distance between the two gripping surfaces 17 and 17' be somewhat greater than the dimensions of the article 4 where same is to be gripped. When the control device 15 is operated fluid under pressure will be supplied to the pneumatic pressure space 13 with the result that an air cushion will be promptly formed in the pneumatic pressure space 13 so that the gripping surface 17 and 17' are moved away from the respective surface 22 of the backing member and are pressed against the corresponding surface 40 of the article. That is to say, the gripping element will bulge outwards towards the opposite gripping element and make snug contact with the surface 40 of the article whatever its shape. In the embodiments shown the surface 40 of the article is flat and for this reason the gripping membrane 21 is flat where it is in contact.

If the internal pressure is sufficiently high the respective article 4 will be held securely between the two gripping elements and in the working example of FIG. 1 it is able to be lifted from the roller conveyor 3.

As compared with rigid gripping surfaces so far used in the art the above-described gripping surface may be made very much larger since the air cushion trapped within the pneumatic pressure space 13 brings about an even distribution of the pressing force so that over practically the whole surface there is the same pressing action. This is more especially useful when it comes to gripping less rigid, unstable articles such as cartons which are relatively gently and softly gripped in the gripping device of the invention although they are firmly held.

A further advantage is that the gripping device of the invention may be used to securely engage articles with irregular surfaces, since the flexible gripping membranes adapt themselves to the respective surface features. It is also relevant in this connection that the pressing engagement between the gripping surface and the surface 40 of the article in question involves a substantial amount of friction so that even a relatively low gripping pressure will preclude the articles to be held from slipping out of the gripping device.

When the article 4 is to be released again it is only necessary to let off the fluid from the pneumatic pressure spaces whereupon the gripping membranes will return into their original positions. In FIGS. 3 and 4 the positions of the gripping membranes in the released state have been indicated in full lines while the broken lines denote the position of the gripping membranes when acting on the article 4 to engage it.

The embodiment of the invention of FIGS. 4 and 5 is particularly suitable for gripping workpieces in the manner of a vise.

I claim:

1. In a gripping device of the kind comprising a pair of gripping elements each including a rigid backing plate and a flexible membrane attached thereto defining therewith a pneumatic pressure space, means mounting the gripping elements spaced apart in opposed relation so that the membranes provide opposed article gripping surfaces defining between them an article receiving space, and means for supplying air under pressure into the pneumatic pressure space, whereby the membranes are deformable by inflation into the article receiving space to grip an article therebetween, the improvement residing in that each backing plate is formed with a continuous, annularly extending, undercut groove and the membrane is integrally formed with a continuous resiliently deformable bead extending completely around its perimeter which bead is receivable in the groove in a snap fit thereby to mount the membrane on the backing plate in hermetic sealing engagement therewith.

2. In a gripping device according to claim 1, the bead and groove are each of T-shaped cross-section, the groove being formed in the side of the plate facing the membrane, and the air supplying means extends through the backing plate.

3. A gripping device comprising two gripping elements mounted in opposed relation, each having a gripping side providing at least one gripping area side facing the respective other gripping element, each gripping element comprising a backing member and a flexible gripping membrane mounted on a side thereof to define therewith, a hermetically sealed pneumatic pressure space, and at least one air supply line, connected to the pneumatic pressure space wherein the gripping membrane is formed in one piece with a first joint half which extends along its entire marginal perimeter and the backing member is formed with a second joint half which receives the membrane in a tight snap fit.

4. A gripping device according to claim 3, wherein the first joint half is an annular collar and the second joint half is an annular groove of complementary shape to the first joint half.

* * * * *